H. L. HOARD.
STEERING DEVICE FOR SLEDS.
APPLICATION FILED MAY 4, 1908.
905,314.
Patented Dec. 1, 1908.
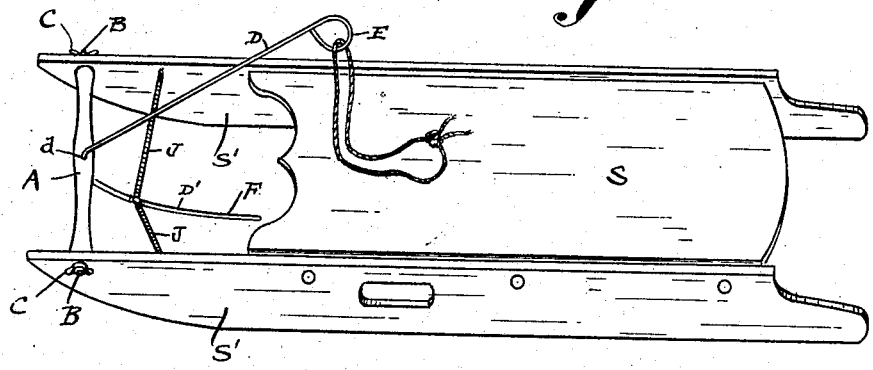
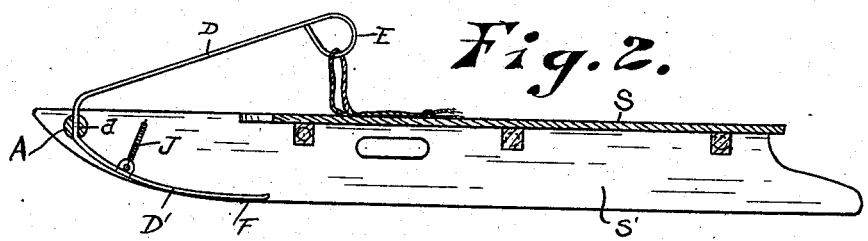
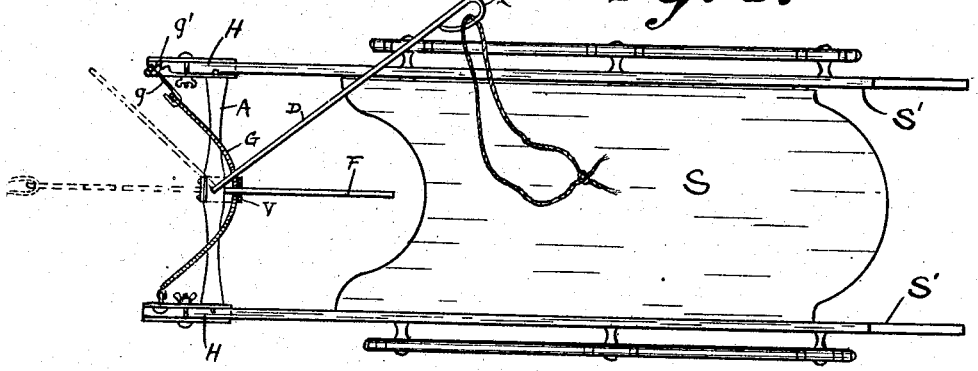
WITNESSES:
O. R. Erwin
J. D. Bremer
INVENTOR
Halbert L. Hoard
By Erwin & Wheeler
ATTORNEYS.

UNITED STATES PATENT OFFICE.

HALBERT L. HOARD, OF FORT ATKINSON, WISCONSIN.

STEERING DEVICE FOR SLEDS.

No. 905,314.      Specification of Letters Patent.      Patented Dec. 1, 1908.

Application filed May 4, 1908. Serial No. 430,640.

*To all whom it may concern:*

Be it known that I, HALBERT L. HOARD, a citizen of the United States, residing at Fort Atkinson, county of Jefferson, and State of Wisconsin, have invented new and useful Improvements in Steering Devices for Sleds, of which the following is a specification.

My invention relates to improvements in steering devices for sleds.

The object of my invention is to provide a simple form of construction in which the movements of the sled may be controlled by means of a steering lever which may be oscillated into and out of operative position and which may be made to retain its position of adjustment if desired until such adjustment is manually changed.

In the following description reference is had to the accompanying drawings in which,—

Figure 1 is a perspective view of a sled embodying my invention. Fig. 2 is a sectional view drawn through the center of the steering lever journal. Fig. 3 is a plan view showing a modified form of construction.

Like parts are identified by the same reference characters throughout the several views.

The sled S is provided with a cross bar A which is preferably connected with the front end of the sled by bolts B, which serve as trunnions and which are provided with thumb nuts C whereby the side rails S' of the sled may be drawn together sufficiently to prevent the bar A from turning readily. The thumb nuts C are preferably rigid on the bolts D, these bolts serving as lag bolts entering the ends of the cross bar A. A steering lever comprising a bent rod D passes through an opening $d$ in the bar A. This steering lever is provided with a handle E at its upper end and at its lower end with a portion F adapted to be brought into contact with the surface over which the sled passes either for steering or braking purposes.

It will be observed that the rod D extends backwardly over the sled from the journal aperture $d$ and that the lower portion of the rod extends backwardly underneath the sled. That portion of the bar which extends through the aperture $d$ is vertical or substantially so and permits the handle E to be readily swung from right to left and left to right, while by pressing downwardly the cross bar A may be rocked upon its supporting trunnions B to permit the portion F to move into and out of contact with the surfaces over which the sled travels. The portion D' of the rod D between the journal $d$ and the contacting extremity F of the rod, is preferably connected with side rails or runners of the sled by means of springs J which may be made to serve the double purpose of normally holding the member F out of operative position and also holding said member normally centered.

Referring to Fig. 3, which shows a modified form of construction, it will be observed that the thumb nuts C are omitted, but the side rails of the sled are connected by means of a tension spring G, whereby the bar A is held in any position of adjustment with considerable rigidity. This spring G is adjustably connected with the side rail at one end, preferably by means of a bolt $g$ and thumb nut $g'$, whereby the tension of the spring may be varied. It will also be observed in Fig. 3 that the lever D is not directly above the brake or steering member F but extends laterally at an angle thereto, whereby when the brake F is in a direct rearwardly trailing position, the operating lever D will occupy a position extending toward one side of the sled. This is regarded as important not only for convenience in operation but for the reason that it is less likely to injure the rider in case the sled should strike an obstruction. In Fig. 3 also the cross bar E is not journaled directly to the side rails of the sled but is journaled in clamping devices H, which are adapted to be secured to any sled irrespective of its construction. This feature is important where the device is to be applied to sleds which are already in use.

It will be understood that the spring G may be employed in connection with the construction shown in Fig. 1, as a substitute for the springs J, if desired. The central portion of the spring G is preferably protected by a shield V, consisting of a piece of sheet metal perforated near one end to receive the rod D and extending around the end surface of the bar A to which it is secured, by ordinary nails or screws in front of the bar A.

Having thus described my invention what I claim as new and desire to secure by Letters Patent is,—

1. The combination with a sled, of a cross bar rotatably connected therewith, a rod having a journal connection with said cross bar and extending rearwardly from the journal above and below said journal, the lower portion of said rod being adapted to move into and out of contact with the surface over which the sled travels, when the cross bar is oscillated, together with spring tension connections between the rod at a point below the cross bar and the respective sides of the sled.

2. The combination with a sled, of a cross bar rotatably connected therewith, a rod having a journal connection with said cross bar and extending rearwardly from the journal above and below said journal, the lower portion of said rod being adapted to move into and out of contact with the surface over which the sled travels when the cross bar is oscillated, the upper portion of said rod being arranged to extend angularly and laterally with reference to the lower portion.

3. The combination with a sled, of a cross bar rotatably connected therewith, a rod having a journal connection with said cross bar and extending rearwardly from the journal above and below said journal, the lower portion of said rod being adapted to move into and out of contact with the surface over which the sled travels when the cross bar is oscillated, together with means for resisting the rotary movement of the cross bar.

4. The combination with a sled, of clamping members adapted to be secured thereto, a cross bar adapted to be journaled in said clamping members, a steering rod having journal connection with the cross bar and extending backwardly from the journal above and below said cross bar.

5. The combination with a sled, of a cross bar mounted to oscillate in suitable bearings connected with the sled and provided with a journal aperture through the bar at an intermediate point, a rod journaled in said aperture and extending backwardly therefrom above and below said cross bar.

In testimony whereof I affix my signature in the presence of two witnesses.

HALBERT L. HOARD.

Witnesses:
R. S. GOESSEL,
A. J. GLOVER.